June 1, 1926.
S. E. STANLEY
1,586,853
TIRE CHAIN FASTENER AND LOCK
Filed Nov. 19, 1925
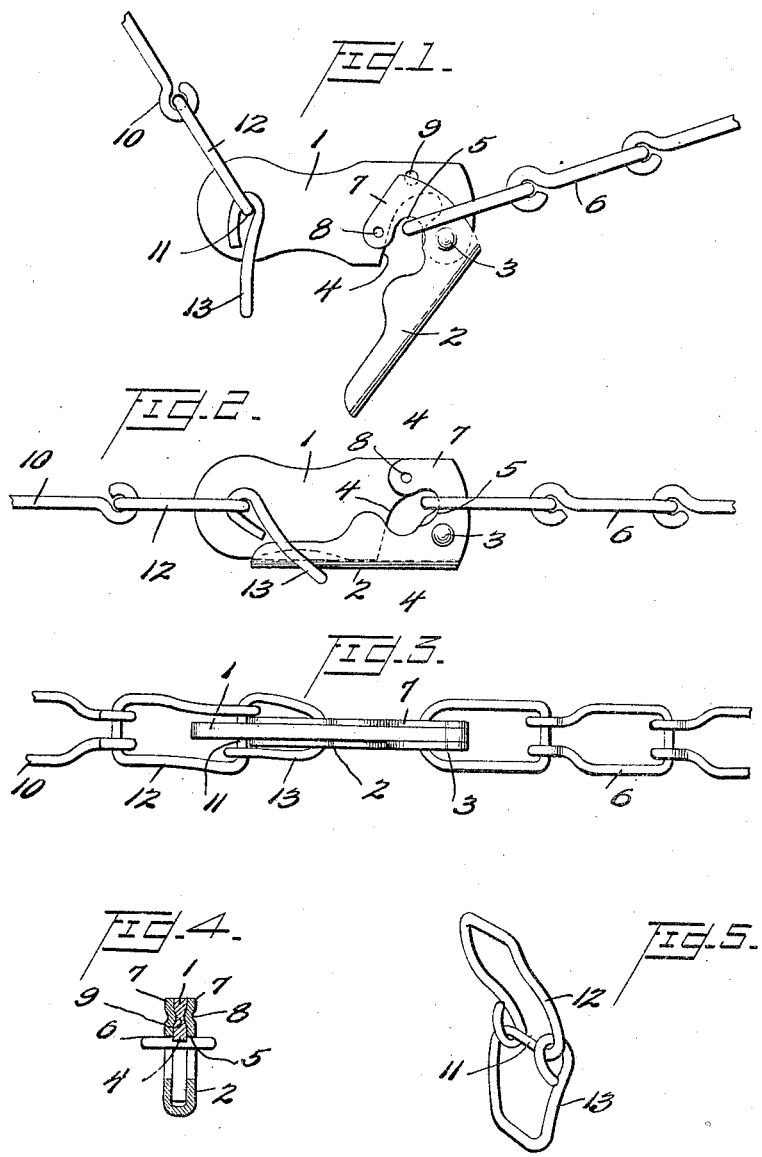
Inventor
Samuel E. Stanley
By Wolfe & Littlehales
Attorneys Patented June 1, 1926.

1,586,853

UNITED STATES PATENT OFFICE.

SAMUEL E. STANLEY, OF FALLS OF ROUGH, KENTUCKY.

TIRE-CHAIN FASTENER AND LOCK.

Application filed November 19, 1925. Serial No. 70,045.

This invention relates to a tire chain fastener and lock and it comprises a body member permanently attached at one end to the tire chain and provided adjacent its other end with a chain receiving groove, a hooked member pivotally mounted on said body member adjacent the chain receiving groove therein adapted to engage and tighten the free end of the tire chain and to transfer such free end to the chain receiving groove in said body member, and a locking member, comprising that link of the chain which is permanently attached to the body member, so formed that when the chain is applied to a tire the tension thereof automatically positions the locking member to prevent accidental release of the free end of the chain.

It is an object of the present invention to provide a tire chain fastener and positive lock therefor which is of simple and durable construction.

A further object is to provide a lock for tire chain fasteners automatically operable when the chain is under tension to prevent accidental release of the free end of the chain.

A still further object is to provide a lock for tire chain fasteners operable by tension of the chain.

Other and further objects will be apparent from the following description taken in connection with the drawings, in which:

Figure 1 is a side view of the tire chain fastener and chain in the initial step of tightening the chain;

Figure 2 is a side view of the tire chain tightener and chain in position for use on a tire wherein the chain is taut;

Figure 3 is a top plan view of the chain tightener and chain as shown in Figure 2;

Figure 4 is a sectional view taken along line 4—4 of Figure 2; and

Figure 5 is a perspective view of the end link of the chain to which the body member of the fastener is permanently attached, and which acts to lock the fastener against accidental release of the free end of the chain.

Referring more particularly to the drawings:

The tire chain fastener comprises a body member 1 and hooked member 2 pivotally mounted on one end thereof as at 3. A groove 4 for receiving the free end of the tire chain is provided in the body member 1 and a corresponding groove 5 is formed in the hooked member 2 so that the free end 6 of the tire chain can be engaged and tightened as the member 2 is swung upwardly toward the body member 1, whereby the free end of the tire chain is transferred to the groove 4.

The hooked member 2 is formed of sheet metal bent upon itself to approximately U-shape in cross-section, as shown in Figure 4, and, in its closed position, is adapted to overlie both sides of the body member 1. Projections 7 define one side of the groove 5 and are formed with inwardly directed teats 8 co-operating with indentations 9 formed in the body member 1, thus serving to frictionally hold hook member 2 in its closed position.

The opposite end of the tire chain is permanently attached to the body member 1 through the medium of link 10 which is of a double-loop construction, as is shown in Figure 5 of the drawing. Link 10 is formed of a single piece of heavy wire or other suitable material from which tire chains are made, bent upon itself to form the double-loop construction shown, so that the portion 11 of the link is adapted to extend through the body member 1. The loops 12 and 13 of the link are so shaped that they lie in planes oblique to each other whereby, when the chain is taut, loop 13 overlies hook member 2 and thereby prevents accidental release of the free end 6 of the chain.

It will thus be seen that I have provided a tire chain fastener of simple and durable construction which is cheap to manufacture and highly efficient in its action of automatically locking the chain against release when the chain is under tension.

Having thus described my invention, what I claim is:

1. In tire chain fasteners, means for engaging and tightening the chain and a lock forming an integral part of the chain and operable by its tension to prevent accidental release of the free end thereof.

2. A fastener for the ends of tire chains comprising a connector member, means pivoted adjacent one end of said member for engaging the free end of a chain and means pivoted adjacent the other end of said connector and formed as an integral part of said chain, to prevent accidental movement of said first-named means.

3. A fastener for tire chains permanently attached at one end to one end of a chain and formed with a link engaging groove at its opposite end, a chain engaging and tightening member pivoted adjacent said groove for tightening the free end of the chain and transferring it to said groove, and locking means for said chain engaging member comprising the end link of the chain so formed that when the chain is applied to a tire and fastened a portion of the link will overlie said chain engaging member to prevent its movement to release the free end of the tire chain.

4. A lock for a tire chain having terminal links, one of said links forming a single loop and the other of said links being bent upon itself to form a double loop, said second-named link being bent so that the loops thereof lie in planes oblique to each other, a member for connecting the ends of the chain and a hook pivoted thereon for engaging said first-named link, one of the loops of said second-named link being adapted to retain said hook in position against said connector member when the chain is in position on a tire, the other of the loops of said second-named link comprising the means of attachment to the next succeeding link in the chain.

In testimony whereof I affix my signature.

SAMUEL E. STANLEY.